Figure 1:
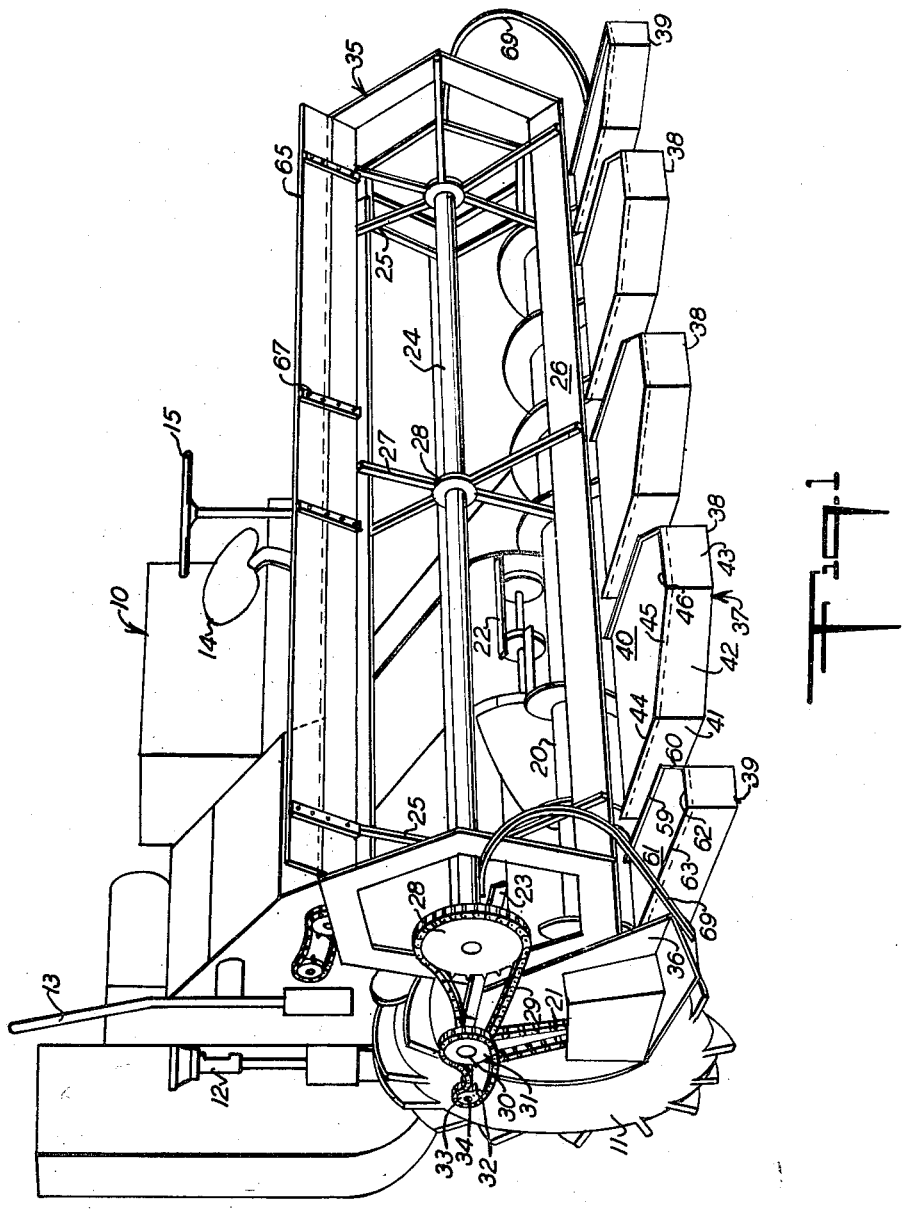

Oct. 9, 1956   W. L. RAUMAKER ET AL   2,765,612
CONVERSION ATTACHMENT FOR COMBINE
Filed Oct. 18, 1954   2 Sheets-Sheet 1

INVENTOR
WILLIAM L. RAUMAKER
EDMUND T. PALMER

BY Herbert J. Jacobi
ATTORNEY

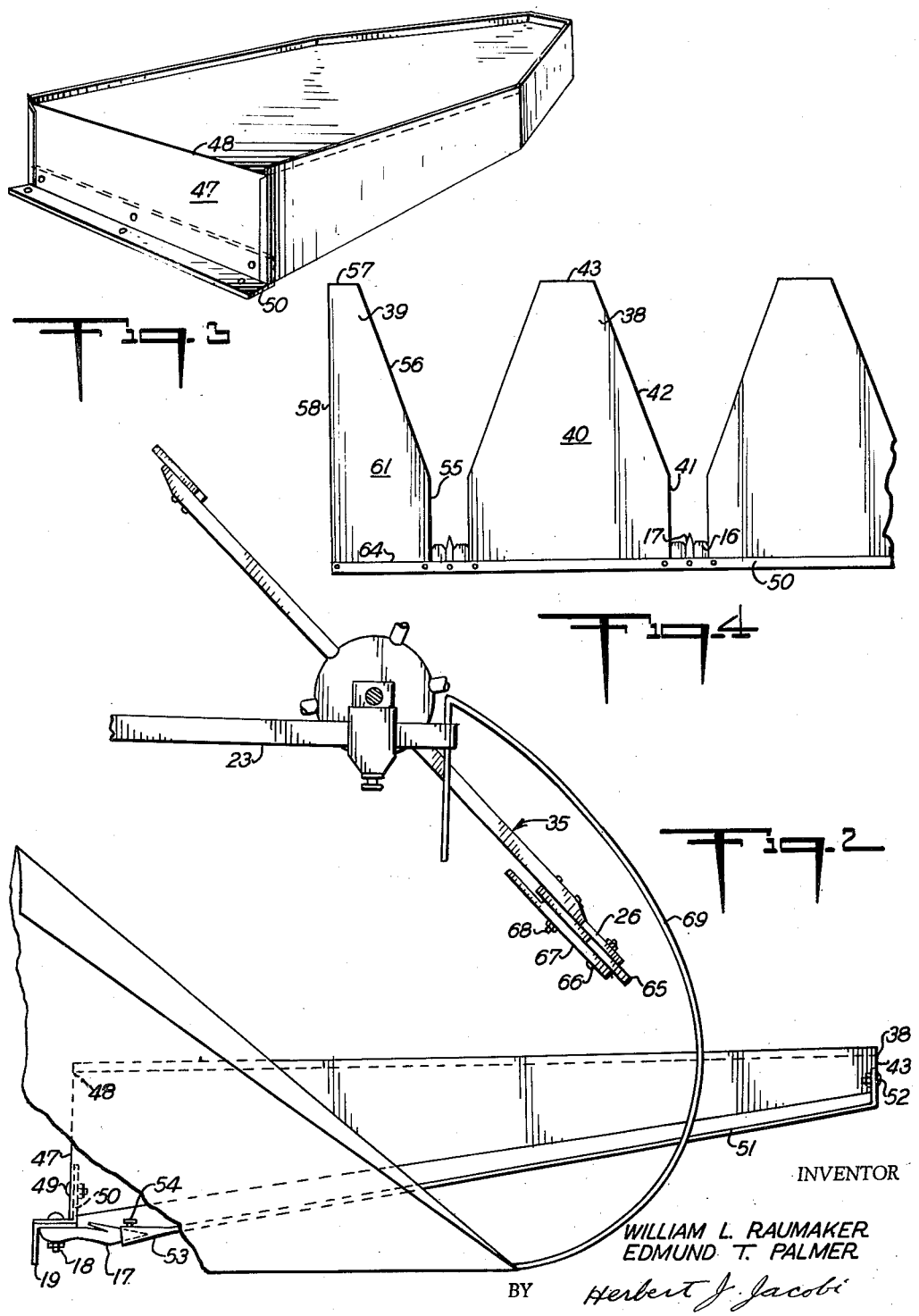

United States Patent Office 2,765,612
Patented Oct. 9, 1956

2,765,612

CONVERSION ATTACHMENT FOR COMBINE

William L. Raumaker and Edmund T. Palmer, Dyersburg, Tenn.

Application October 18, 1954, Serial No. 462,914

1 Claim. (Cl. 56—97)

This invention relates to agriculture and more particularly to an apparatus to be attached to a conventional grain harvester combine for conveniently converting the same to a combine for harvesting corn.

In the past the use of grain harvesting combines for harvesting corn has not proved too successful in view of the fact, that when the blades on the reel of the combine contact the corn and when the same is cut, the ears of corn very frequently become detached from the stalks and fall to the ground where they are lost or such ears must be picked up after passage of the combine. Since the ear corn constitutes an appreciable percentage of the yield per acre, it will be readily understood that any apparatus which will permit harvesting substantially all of the ear corn and feeding the same into the combine, is a very material step forward in the art.

Since combines of the type utilized with this invention are relatively costly, it would be obviously impractical for the average farmer to have one combine for harvesting grain and another combine for harvesting corn. Consequently, as a result of this invention it is possible to conveniently convert a conventional combine for use in harvesting corn and, when desired, to remove the conversion apparatus and utilize such combine for its intended purpose in harvesting grain. In this way, one combine is made to serve all purpose, consequently, thereby materially reducing the investment necessary for farm equipment.

It is accordingly an object of this invention to provide an apparatus for converting a conventional grain harvester combine to a corn harvester combine which apparatus may be conveniently installed or removed from the combine by relatively unskilled labor and without requiring the use of special tools.

A further object of the invention is the provision of an apparatus for converting a conventional grain harvester combine to a corn harvester combine which requires only minor modifications of such combine to adapt the conversion apparatus thereto.

A still further object of the invention is the provision of an apparatus for converting a conventional grain harvester combine to a corn harvester combine, which apparatus insures that substantially all of the ear corn harvested will be collected and delivered to the combine.

Another object of the invention is the provision of an apparatus for converting a conventional grain harvester combine to a corn harvester combine, which apparatus in no way operates to reduce the efficiency or speed of operation of the combine and at the same time, reduces the cost of operation thereof by preventing loss of ear corn which otherwise would have to be recovered from the ground after passage of the combine.

A further object of the invention is the provision of an apparatus for converting a conventional grain harvester combine to a corn harvester combine, which apparatus may be conveniently adjusted for use in harvesting all types and sizes of corn.

A still further object of the invention is the provision of an apparatus for converting a conventional grain harvester combine to a corn harvester combine, which apparatus may be conveniently and economically constructed from readily available and relatively lightweight materials and attached to such combine without materially increasing the weight thereof.

Another object of the invention is the provision of an apparatus for converting a conventional grain harvester combine to a corn harvester combine, which apparatus in no way changes or alters the normal operation of such combine.

Further objects and advantages of the invention will be apparent from the following description taken in conjunction with the accompanying drawing wherein:

Fig. 1 is a view in perspective showing the conversion apparatus of this invention attached to a conventional grain harvester combine;

Fig. 2, a fragmentary side elevational view with parts in section for greater clarity and showing the operative relationship between the elements of the conversion apparatus of this invention;

Fig. 3, a view in perspective showing one of the ear corn receiving platforms; and Fig. 4, a fragmentary top plan view drawn to a reduced scale showing the ear corn receiving platforms and their relationship to the cutter or sickle bar of the combine.

With continued reference to the drawing there is shown a combine 10 carried by ground engaging wheels 11 and provided with a power plant of the internal combustion engine variety, not shown in the drawing, but having an air intake 12 and an exhaust 13. The combine 10 is provided with a seat 14 for the operator located in a convenient position to observe the operation of the combine and there is also provided a steering wheel 15 adjacent the seat 14 which is utilized to guide the combine during harvesting operations and for transportation from one field to another.

As shown in Figs. 2 and 4, the combine 10 is provided with a cutter 16 of the reciprocating sickle bar type, and such cutter is guided and protected by guard fingers 17 attached by means of screw threaded fasteners or the like 18 to a cross frame member 19 of the combine 10. The sickle bar 16 is reciprocated by suitable mechanism from the power plant carried by the combine 10. The combine 10 is also provided with a spiral-type or screw conveyor 20 which may be driven through a chain 21 from the power plant of the combine, and, as will be noted from an inspection of Fig. 1, the conveyor 20 operates to deliver grain harvested by the combine from each side thereof to the center where the same is delivered to an endless conveyor 22 which serves to convey the grain into the combine for further operations thereon.

Bars 23 extend forwardly of the combine 10 on each side thereof above the sickle bar 16 and rotatably mounted on these bars 23 is a transversely extending shaft 24 from each end of which emanate radial spokes 25 to the outer end of which are attached blades 26 providing a reel, the purpose and operation of which will be presently described. Since the blades 26 are commonly formed by elongated boards, the same are supported adjacent the center thereof by radial spokes 27 secured to a hub 28 mounted on the shaft 24 and attached at their outer ends to the blades 26. The shaft 24 may be provided with a sprocket 28 on one end thereof, which serves to engage a drive chain 29 trained over a sprocket (not shown) mounted on a countershaft 30 which in turn carries another sprocket 31 serving to engage a chain 32, which in turn engages a sprocket 33 mounted on a shaft 34 driven by the power plant on the combine 10. This results in providing a continuous rotational drive for the blades 26 which form the reel 35. Sheet metal guards 36 are provided at each end of the sickle bar 16 on opposite sides of the combine 10 in order to prevent grain being harvested from falling to the sides and to guide the same into engagement with the screw conveyor 20.

The combine, above described, is entirely conventional in every respect and the illustration and above description thereof has been given in some detail in order to provide a foundation and to permit a complete and accurate description of the apparatus which may be attached thereto for converting the same from a conventional grain harvesting combine to a corn harvesting combine.

The conversion apparatus of this invention may well comprise a plurality of platforms or trays 37 and, as shown in Fig. 1, three trays 38 may be attached in spaced relation to the combine 10 on the front end thereof and extending forwardly of the sickle bar 16 and two trays 39 of somewhat different configuration from the trays 38, may be attached to the front of the combine 10 at each side thereof and extending forwardly of the sickle bar 16.

Each tray 38 may comprise a flat, top wall 40 which, as best shown in Figs. 1, 3 and 4, is provided with a generally rectangular rear portion and a tapered forward portion terminating in a blunt forward end. Substantially parallel side walls 41 merge into converging side walls 42 which terminate at the front end of the tray 38 and are connected by a front wall 43. Parallel side walls 41 and converging side walls 42 project above the top wall 40 to provide upwardly extending side portions 44 and 45 and the front wall 43 projects above the top wall 40 to provide an upstanding portion 46. These upstanding portions 44, 45 and 46 are provided for the purpose of preventing ears of corn which may be deposited on the top wall 40, from rolling off the sides or front edges of the tray 38 and since the width of each tray 38 is substantially equal to the distance between adjacent rows of corn to be harvested, any ears of corn which may become detached from the stalks, fall and are deposited on the top wall 40. These trays 38 thereby serve to prevent such detached ears of corn from falling to the ground and being lost or necessitating their recovery by picking the same up individually after passage of the combine 10. It is to be noted, that the forward end of the space between adjacent trays 38 is flared, due to the divergence of the confronting walls forming such space, and serves to guide stalks of corn therebetween to the sickle bar 16, where the same is cut in a conventional manner.

The trays 38 may be formed of suitable sheet metal, plywood, or other suitable materials and, as shown in Figs. 2 and 3, the same are provided with a rear wall 47 which terminates at or below the rear edge 48 of the top wall 40. The rear wall 47 may be attached by screw threaded fastening means or rivets 49 or any other suitable fastening means, to an angle member or other suitable frame member 50 and this member 50 may in turn be secured to the cross frame member 19 of the combine 10. The frame member 50 may be attached to the frame member 19 by the fastening means 18 utilized to secure the guard fingers 17 in place or any other suitable or separate fastening means may be employed, as desired. The tray 38 may also, if desired, be provided with a brace member 51 secured to the front wall 43 by suitable fastening means 52, the brace member 51 extending rearwardly and being provided with an enlarged socket 53 for receiving the forward end or pointed portion of the guard finger 17. The socket 53 and brace member 51 may be conveniently attached to the guard finger 17 by a set screw or other suitable fastening means 54, threadedly received in the wall of socket 53 and engaging the guard finger 17.

It will thus be seen, that the trays 38 may be conveniently attached to the combine 10 or removed therefrom, merely by attaching the frame member 50 thereto and by securing the brace members 51 to the guard fingers 17. If desired, however, the brace members 51 may be omitted and suitable fastening means provided to secure the trays directly to the frame of the combine 10 in any manner which will provide suitable strength for supporting the same therefrom. It is further to be noted, that the trays 38 extend forwardly of the sickle bar 16 and that the top wall 40 of the trays 38 is located above the sickle bar 16 and immediately forward of the screw conveyor 20, this disposition of the trays 38 resulting in the top wall 40 thereof receiving substantially all ears of corn which may become detached from the stalks during the cutting and harvesting thereof.

The trays 39 disposed at each side of the combine 10 are formed in the same manner as the trays 38 except that the same are substantially the width of such trays. These trays 39 have substantially straight side walls 55 which merge into an angularly disposed side wall 56, which in turn terminates at a front wall 57. The opposite side wall 58 of the trays 39 is straight and extends the full length thereof. The upper edges 59 and 60 of the side walls 55 and 56 respectively, extend above the top wall 61 of the tray 39 and the front wall 57 likewise extends above the top wall 61, as shown at 62. The opposite side wall 58 extends above the top wall 61, as shown at 63, and since the rear wall 64 terminates at or below the top wall 61, the upwardly extending portions of the side and front walls provide rails which prevent ear corn deposited on the top wall 61 from rolling off either side or the front thereof.

By the above described arrangement of trays 38 and 39, it will be seen that the entire length of the sickle bar 16 is taken care of and that all corn presented thereto for cutting passes beween adjacent trays and that consequently, any of the ears becoming detached from such stalks of corn will fall on one or the other of such trays and will be prevented from falling to the ground where the same might be lost.

The reel 35 in a conventional combine operates as it rotates to engage the grain being harvested thereby, to insure that all such grain, as the same is cut by the sickle bar, is merged into the combine and into engagement with the conveyors provided thereby, since were the reel 35 not provided, a certain portion of such grain would fall forwardly to the ground and pass beneath the combine as it moved over the field in the harvesting operation. The conversion apparatus of this invention contemplates a slight modification of the reel 35 in order to provide means for engaging and moving ears of corn deposited on the tops walls 40 and 61 of the trays 38 and 39, rearwardly thereof and over the open rear edges of such trays into engagement with the spiral conveyor 20 where such ears of corn are conveyed toward the center of the combine 10 and into engagement with the endless conveyor 22 to be carried into the combine for further operations thereon.

This modification of the reel 35 is best shown in Figs. 1 and 2, and may well comprise auxiliary blades 65 extending throughout the length of the reel 35 and detachably secured to alternate reel blades 26. The auxiliary blades 65 may be secured in place by screw threaded or other suitable fastening means 66 engaging the reel blades 26 and, if desired, reinforcing cleats 67 secured to the reel 35 by suitable fastening means 68 and to the auxiliary blades 65 by the fastening means 66 may be employed in order to provide sufficient strength to the auxiliary blades 65. Also, if desired, suitable slots may be provided for receiving the fastening means 66 and 68 to permit adjustment of auxiliary blades 65 thereby varying the effective diameter of the reel 35. The particular fastening means for securing the auxiliary blades 65 to the reel blades 26 has been shown, for illustrative purposes only, and obviously, a suitable fastening means which will carry out the purpose intended may be employed, if desired. The auxiliary blades 65 may be formed of wood, metal or any other suitable material will, of course, be of a size commensurate with the size of the reel blades 26 provided on the reel 35 of the combine 10.

The auxiliary blades 65 are so mounted or adjusted on alternate reel blades 26 of the reel 35, that the outer ends thereof will just clear the upstanding side walls of the trays 38 and 39 and engage any ears of corn deposited thereon, to move such ears of corn rearwardly of the trays and over the rear edges thereof into engagement with the spiral conveyor 20. At the same time, the auxiliary blades 65 as well as the regular blades 26 of the reel 35 will operate to engage the stalks of corn and move the same rearwardly as they cut by the sickle bar 16, into engagement with the spiral conveyor 20 to be moved into engagement with the endless conveyor 22 and carried into the combine 10. In order to prevent the stalks of corn from falling to the sides of the combine, there may be provided guards in the form of curved bars 69 secured to the frame of the combine 10 and to the forwardly extending bars 23 which serve to support the reel 35. Thus all corn passing between the bars 69 will be engaged by the blades of the reel 35 and will pass between the trays 38 and 39 and into engagement with the sickle bar 16 to be cut and conveyed into the combine 10.

Since the screw conveyor 20 rotates at a relatively high speed, corn contacting the same is thrown forwardly out of the machine and in the absence of trays 37 this corn would fall to the ground and be lost. Therefore, for all practical purposes, the conventional combine is not usable as a corn harvester without the conversion attachment of this invention.

It will therefore be seen, that in order to convert a conventional grain harvesting combine to a corn harvesting combine, it is only necessary to attach the trays 38 and 39 thereto and to attach the auxiliary blades 65 to alternate blades 26 of the reel 35 and thereafter, the apparatus is in condition to harvest corn and to recover substantially all ears of corn which may become detached from the stalks. In order to reconvert the combine for harvesting grain, it is only necessary to remove the trays 38 and 39 and the auxiliary blades 65 whereupon the original condition of the combine is restored.

Obviously, the conversion apparatus of this invention may be very economically produced and may be applied to the combine by relatively unskilled labor and without the use of special tools, which conversion may be accomplished in a relatively short time. By this invention, it is obvious that the utility of conventional combine is materially increased and that corn as well as other grain crops may be conveniently harvested thereby and the maximum yield processes by such combine. Also very minor modifications of the combine are necessary, since these only require the provision of suitable apertures or attaching means for securing the platforms 38 and 39 in place, and for securing the auxiliary blades 65 to the conventional blades 26 of the reel 35 normally provided on the combine 10.

It will be obvious to those skilled in the art that various changes may be made in the invention without departing from the spirit and scope thereof and therefore the invention is not limited by that which is shown in the drawing and described in the specification, but only as indicated in the appended claim.

What is claimed is:

Apparatus for converting a conventional grain harvester combine to a corn harvester combine, said conventional combine being supported on ground engaging wheels and having a power plant, a sickle bar driven by said power plant, a reel having a plurality of grain engaging blades driven by said power plant and conveyor means for receiving grain cut by said sickle bar, said apparatus comprising a plurality of spaced trays mounted on said combine adjacent said sickle bar and extending forwardly thereof, the spaces between said trays being spaced a distance substantially equal to the distance between adjacent rows of corn, each tray having a flat top wall and substantialy parallel side wall portions merging into forwardly converging side wall portions and a front end wall, said side wall portions and said front end wall extending above said top wall whereby ears of corn deposited on said trays will be prevented from rolling off the side or front edges thereof, the spaces between adjacent trays acting to guide cornstalks into engagement with said sickle bar, and auxiliary blades coextensive with and adjustably mounted on alternate reel blades whereby upon rotation of said reel ears of corn deposited on said trays will be engaged by said auxiliary blades and removed from said trays over the open rear ends thereof and into said conveyor means to be conveyed into said combine.

References Cited in the file of this patent

UNITED STATES PATENTS

| | | |
|---|---|---|
| 1,113,602 | Christensen | Oct. 13, 1914 |
| 1,882,823 | Hale et al. | Oct. 18, 1932 |
| 2,575,120 | Peel | Nov. 13, 1951 |